US009123989B2

(12) United States Patent
Peng et al.

(10) Patent No.: US 9,123,989 B2
(45) Date of Patent: Sep. 1, 2015

(54) ANTENNA APPARATUS AND ANTENNA SWITCH CIRCUIT

(75) Inventors: Chih-Hsiang Peng, Hsinchu (TW); Pao-Heng Chen, Hsinchu (TW); Cheng-Hsiung Lu, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 131 days.

(21) Appl. No.: 13/441,125

(22) Filed: Apr. 6, 2012

(65) Prior Publication Data

US 2013/0187807 A1 Jul. 25, 2013

(30) Foreign Application Priority Data

Jan. 19, 2012 (TW) ............................ 101102119 A

(51) Int. Cl.
*H04B 1/38* (2015.01)
*H01Q 3/24* (2006.01)
*H01Q 1/22* (2006.01)

(52) U.S. Cl.
CPC ............... *H01Q 3/24* (2013.01); *H01Q 1/2258* (2013.01)

(58) Field of Classification Search
CPC ............................... H01Q 1/2258; H01Q 3/24
USPC ..................... 455/73, 78, 562.1, 81; 342/175; 343/702, 876
See application file for complete search history.

(56) References Cited

U.S. PATENT DOCUMENTS

| | | | | |
|---|---|---|---|---|
| 2004/0242277 | A1* | 12/2004 | Kiribayashi | 455/562.1 |
| 2005/0124300 | A1* | 6/2005 | Khorram | 455/78 |
| 2006/0151614 | A1* | 7/2006 | Nishizawa et al. | 235/492 |
| 2007/0117523 | A1* | 5/2007 | Weber et al. | 455/81 |
| 2008/0036681 | A1* | 2/2008 | Caesar | 343/876 |
| 2008/0233890 | A1* | 9/2008 | Baker | 455/73 |
| 2009/0278750 | A1* | 11/2009 | Man et al. | 343/702 |
| 2010/0188065 | A1* | 7/2010 | Shiwaya | 323/299 |
| 2010/0188165 | A1* | 7/2010 | Nakamura et al. | 333/124 |
| 2012/0074231 | A1* | 3/2012 | Jain et al. | 235/492 |
| 2012/0214422 | A1* | 8/2012 | Shi et al. | 455/67.11 |

FOREIGN PATENT DOCUMENTS

CN 101330323 12/2008

* cited by examiner

*Primary Examiner* — Wesley Kim
*Assistant Examiner* — Raj Chakraborty
(74) *Attorney, Agent, or Firm* — McClure, Qualey & Rodack, LLP

(57) ABSTRACT

An antenna device and an antenna switch circuit are provided. The antenna device comprises a first antenna, an antenna detection circuit, a switch control circuit, and a controller. The first antenna is configured to transmit an RF signal. The antenna detection circuit comprises an inductor configured to detect a second antenna. The switch control circuit is coupled to the antenna detection circuit and configured to generate a first control signal indicative of the presence of the second antenna upon the detection thereof. The controller is coupled to the first antenna, the antenna detection circuit and the switch control circuit, and configured to receive the first control signal and connect to the second antenna when the first control signal indicates the presence of the second antenna.

8 Claims, 2 Drawing Sheets

ANTENNA APPARATUS AND ANTENNA SWITCH CIRCUIT

CROSS REFERENCE TO RELATED APPLICATIONS

This Application claims priority of Taiwan Patent Application No. 101102119, filed on Jan. 19, 2012, and the entirety of which is incorporated by reference herein.

BACKGROUND OF THE INVENTION

1. Field of the Invention

The present invention relates to electronic circuits, and in particular relates to an antenna apparatus and an antenna switch circuit.

2. Description of the Related Art

As wireless communication technology advances, more and more devices are now equipped with two sets of antennas. The microprocessor in the dual-antenna device switches to a particular set of antennas during device operation. Currently, the dual-antenna devices either employ a General Proposed Input Output (GPIO) on the microprocessor dedicated for antenna switching, or utilize a special electronic or mechanical switch connector for switching to an antenna to be used. The GPIO approach fails when no spare GPIO is available on the microprocessor, whereas the special electronic or mechanical switch connector method increases manufacturing cost.

BRIEF SUMMARY OF THE INVENTION

In one aspect of the invention, an antenna device is disclosed, comprising a first antenna, an antenna detection circuit, a switch control circuit, and a controller. The first antenna is configured to transmit an RF signal. The antenna detection circuit comprises an inductor configured to detect a second antenna. The switch control circuit is coupled to the antenna detection circuit and configured to generate a first control signal indicative of the presence of the second antenna upon the detection thereof. The controller is coupled to the first antenna, the antenna detection circuit and the switch control circuit, and configured to receive the first control signal and connect to the second antenna when the first control signal indicates the presence of the second antenna.

In another aspect of the invention, an antenna switch circuit is provided, comprising an antenna detection circuit and a switch control circuit. The antenna detection circuit comprises an inductor configured to detect the presence of a first antenna. The switch control circuit is coupled to the antenna detection circuit and configured to generate a first control signal indicative of the presence of the first antenna upon the detection thereof, and controls a controller to connect to the first antenna according to the first control signal.

Other aspects and features of the present invention will become apparent to those with ordinarily skill in the art upon review of the following descriptions of specific embodiments of the antenna apparatus and the antenna switch circuit.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense.

Figure 1:
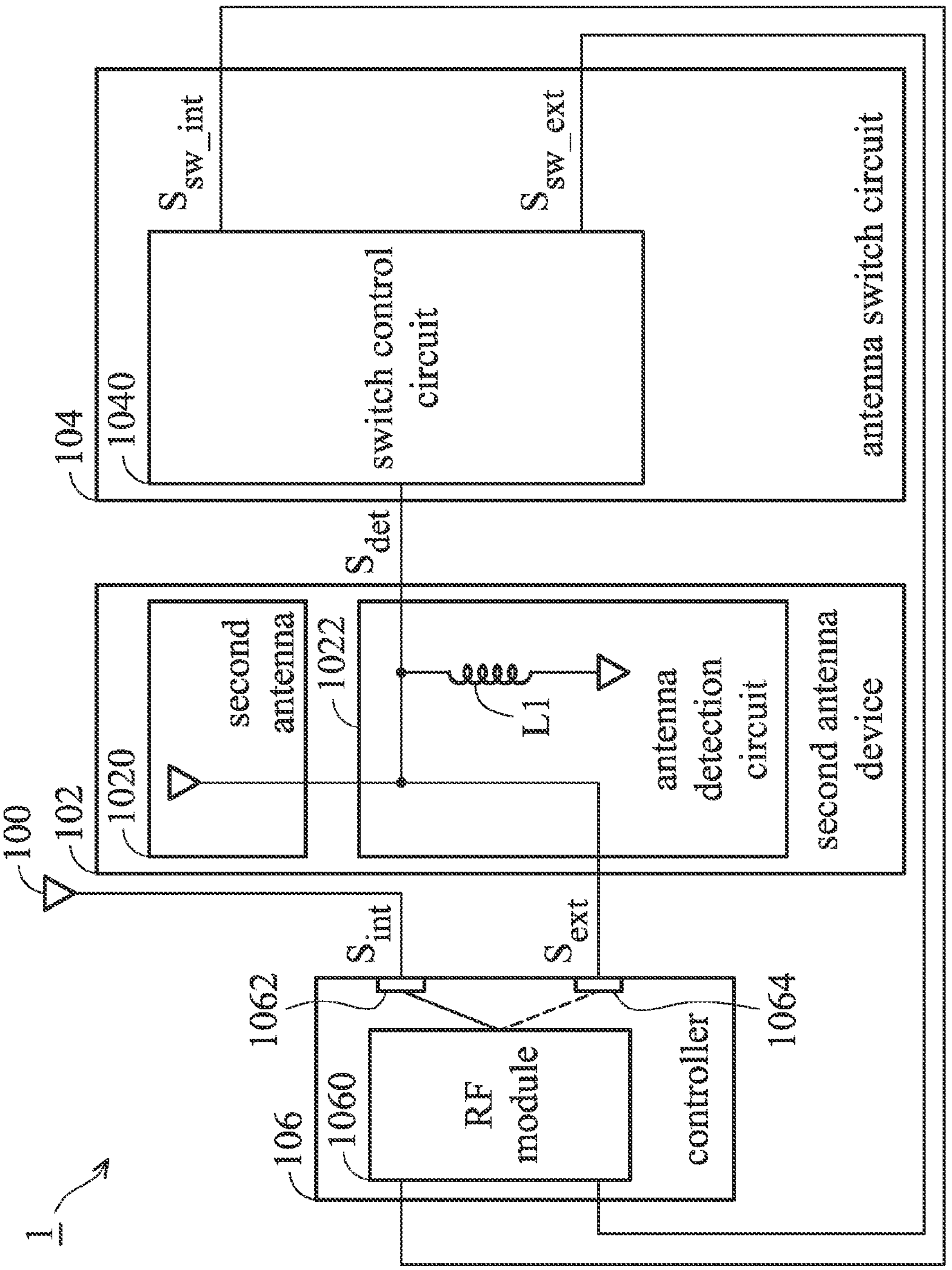
FIG. 1 is a block diagram of an antenna device 1 according to an embodiment of the invention.

FIG. 1 is a block diagram of an antenna device 1 according to an embodiment of the invention, comprising a first antenna 100, a second antenna device 102, an antenna switch circuit 104 and a controller 106. The controller 106 is coupled to the first antenna 100 and the antenna switch circuit 104 which may further be coupled to the second antenna device 102. The antenna device 1 may be implemented in a digital camera, a computer, a mobile phone, or any electronic device capable of providing communication. The first antenna 100 is a built-in antenna, implemented in the antenna device 1 to provide basic data transceiving. The second antenna 1020 is an external antenna which is selected and provided by a user, providing a required antenna efficiency and data transmission quality. The external second antenna 1020 is coupled to the controller 106 through the antenna switch circuit 104. When the second antenna device 102 is absent from a connection to the antenna switch circuit 104, the antenna 1 employs the built-in first antenna 100 to perform an uplink or downlink data transmission. When the external second antenna device 102 is coupled to the antenna switch circuit 104 by insertion or other means, the antenna switch circuit 104 can replace the first antenna 100 with the second antenna 1020 by switching from the built-in first antenna 100 to the external second antenna 1020. The second antenna 1020 serves as the transceiving antenna of the electronic device, and transmits and receives wireless signals from the air interface. The switch between the built-in antenna 100 and the external second antenna is controlled by the antenna switch circuit 104, and is triggered by the attachment of the external second antenna 102.

The controller 106 may be implemented by one or more microprocessors, processors, controllers, microcontrollers, or integrated circuits. The controller 106 generates an uplink Radio Frequency (RF) signal to be transmitted to the air interface through the built-in first antenna 100 or the external second antenna 1020, and processes a downlink RF signal retrieved from the built-in first antenna 100 or the external second antenna 1020. The controller 106 comprises a first IO port 1062, a second IO port 1064, an RF module 1060 and a baseband module (not shown). The RF module 1060 comprises a transmitter (not shown) and a receiver (not shown). The transmitter receives a baseband signal from the baseband module, to which the transmitter performs various signal processing processes including digital-to-analog conversion, filtering, up-conversion, and power amplification, thereby outputting the uplink RF signal for transmission. In contrast, the receiver receives the downlink RF signal to which various signal processing processes including signal amplification, down-conversion, filtering, and analog-to-digital conversion are performed to derive the baseband signal for digital signal processing. The controller 106 can be coupled to only one of the internal first antenna 100 and the external second antenna 1020, and performs uplink and downlink transmission via the selected antenna. In some embodiments, the controller 106 deploys a switch to switch between the internal first antenna 100 and the external second antenna 1020. In other embodiments, the controller 106 utilizes a multiplexer (not shown) to select one from the internal first antenna 100 and the external second antenna 1020. The controller 106 receives a first control signal $S_{sw\_ext}$ and a second control signal $S_{sw\_int}$ to respectively control connections to the external second antenna 1020 and the internal first antenna 100. In some embodiments, the first control signal $S_{sw\_ext}$ and the second control signal $S_{sw\_int}$ are complimentary to each other, so that when one in the first antenna 100 and the second antenna 1020 is connected to the controller 106, the other is disconnected from the controller 106 concurrently. For example, the first control signal $S_{sw\_ext}$ is a predetermined voltage $V_{RF}$ in 3.3V, indicating presence of the external second antenna 1020 and establishing the connection to the second antenna 1020. Concurrently, the second control signal $S_{sw\_int}$ is a ground voltage VGND in 0V, disconnecting the connection to the first antenna 100. The RF module 1060 controls the connections to the first antenna 100 and the second antenna 1020 according to the first control signal $S_{sw\_ext}$ and the second control signal $S_{sw\_int}$. When the first control signal $S_{sw\_ext}$ is the predetermined voltage $V_{RF}$ and the second control signal $S_{sw\_int}$ is 0V, the RF module 1060 switches from the first IO port 1062 to the second IO port 1064, thereby establishing the connection between the RF 1060 and the external second antenna 1020 via the second IO port 1064 and the antenna switch circuit 104. Conversely, when the first control signal $S_{sw\_int}$ is 0V and the second control signal $S_{sw\_int}$ is the predetermined voltage $V_{RF}$, the RF module 1060 switches from the second IO port 1064 to the first IO port 1062, thereby executing operations using the internal antenna 100.

The antenna switch circuit 104 may be realized by discrete components on a Printed Circuit Board (PCB). The antenna switch circuit 104 comprises a switch control circuit 1040. The second antenna device 102 comprises a second antenna 1020 and an antenna detection circuit 1022, detecting the presence of the second antenna 1020. The antenna detection circuit contains an inductor L1 in series between the second antenna 1020 and the ground terminal When the external second antenna device 102 is not connected to the antenna switch circuit 104, the antenna detection signal $S_{det}$ indicates an open-circuited connection. Conversely when the external second antenna device 102 is connected to the antenna switch circuit 104, the inductor L1 serves as a short-circuited path for a low-frequency signal, through which the low-frequency signal is directed to the ground terminal. Meanwhile, the inductor forms an open-circuit path for a high-frequency signal, so that the antenna detection circuit 1022 may output the antenna detection signal $S_{det}$ to inform the switch control circuit 1040 of the presence of the second antenna 1020. The switch control circuit 1040 determines the presence of the external second antenna 1020 by the antenna detection signal $S_{det}$, and produces the first control signal $S_{sw\_ext}$ representing the presence of the second antenna 1020 to employ the second antenna 1020 for transmitting and receiving the RF signals. In some embodiments, after determining that the external second antenna 1020 is attached to the antenna device 1, the switch control circuit 1040 also produces the second control signal $S_{sw\_int}$ to disconnect the internal first antenna 100 from the controller 106.

Instead of using special RF connectors or high cost microprocessors, the antenna device 1 utilizes the antenna switch circuit 104 realized by discrete circuits to switch between the antenna electronically, reducing manufacturing cost and decreasing power consumption of the controllers or microprocessors.

Figure 2:
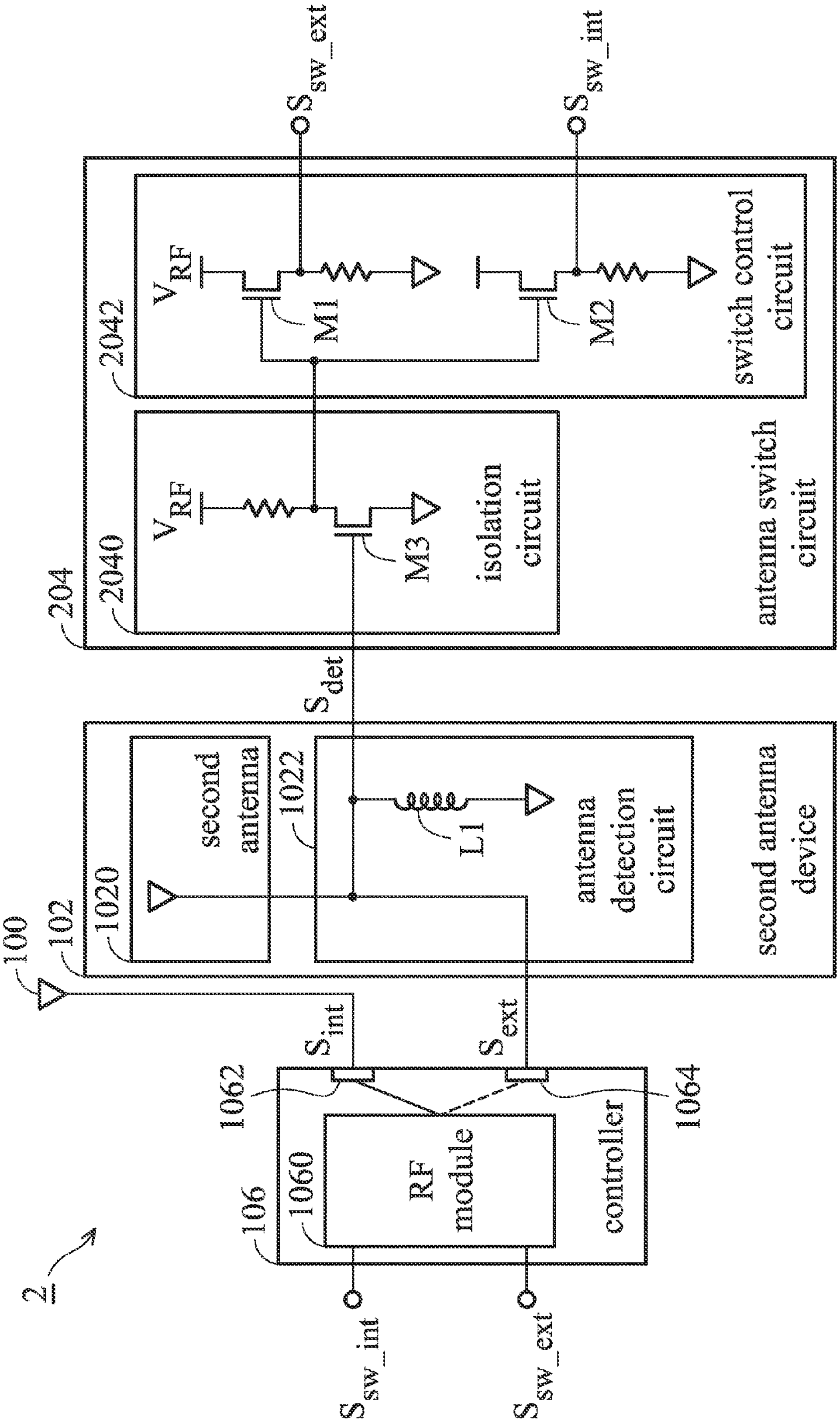
FIG. 2 is a circuit schematic of an antenna device 2 according to an embodiment of the invention.

FIG. 2 is a circuit schematic of a antenna device 2 according to an embodiment of the invention, comprising a first antenna 100, a second antenna device 102, a antenna switch circuit 204, and a controller 106. The circuit configuration and operation of the antenna device 2 in FIG. 2 is identical to the antenna device 1 in the FIG. 1, and reference can be made to the preceding paragraphs. The antenna switch circuit 204 manifests an implementation of the antenna switch circuit 104, comprising an isolation circuit 2040 and a control circuit 2042. The antenna detection circuit 1022 is coupled to the isolation circuit 2040 which is then coupled to the switch control circuit 2042. The antenna detection circuit 1022 and switch control circuit 2042 in FIG. 2 correspond to the antenna detection circuit 1022 and the switch control circuit 1040 in FIG. 1, wherein each has identical functionalities to the corresponding circuit.

The isolation circuit 2040 is coupled between the antenna detection circuit 1022 and the switch control circuit 2042, isolating the antenna detection circuit 1022 from the switch control circuit 2042, and outputting an isolation output signal to the switch control circuit 2042 upon detecting the antenna detection signal $S_{det}$ from the antenna detection circuit 1022, which triggers the control circuit 2042 to produce the first control signal $S_{sw\_ext}$. The isolation circuit 2040 may include a biased resistor and a transistor M3 coupled thereto. In some embodiments, the transistor M3 is realized by an NMOS transistor. When the second antenna device 102 is disconnected from the system, the antenna detection signal $S_{det}$ carries a predetermined voltage $V_{det}$, the NMOS transistor M3 is turned on to output 0V as the isolation circuit output signal to the switch control circuit 2042, thereby informing the switch control circuit 2042 of the absence of the second antenna 1020. When the second antenna device 102 is connected to the system, the antenna detection signal $S_{det}$ is 0V, and the NMOS transistor M3 is turned off to output $V_{RF}$ as the isolated circuit output signal, informing the switch control circuit 2042 of the presence of the second antenna 1020. The switch control circuit 2042 comprises a first resistor, a first transistor M1 coupled to the first resistor, a second resistor, and a second transistor M2 coupled to the second resistor. When the isolation circuit output signal is 0V, the switch control circuit 2042 is informed of the absence of the second antenna 1020, and the first transistor M1 is turned off and the second transistor is turned on to produce the first control signal $S_{sw\_ext}$ in 0V and the second control signal $S_{sw\_int}$ being the predetermined voltage $V_{RF}$. Accordingly, the controller 106 connects to the internal first antenna 100 and disconnects the connection port to the second antenna 1020. When the isolation circuit output signal is $V_{RF}$, the switch control circuit 2042 is informed of the presence of the second antenna 1020, and the first transistor M1 is turned on and the second transistor M2 is turned off, producing the first control signal $S_{sw\_ext}$ as $V_{RF}$ and the second control signal $S_{sw\_int}$ in 0V. Accordingly, the controller 106 disconnects the connection to the first antenna 100 and connects to the second antenna 1020.

The antenna device 2 employs an antenna switch circuit 204 to electronically switch between antennas without use of special RF connectors or high cost microprocessors, reducing manufacturing cost and decreasing power consumption of the controllers or microprocessors.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna device, comprising:

a first antenna, configured to transmit an RF signal;

an antenna detection circuit, comprising an inductor configured to detect a second antenna and directly connected between the second antenna and a ground terminal, wherein when the second antenna is absent, the inductor serves as an open-circuit path for a high-frequency signal, when the second antenna is present, the inductor serves as a short-circuited path for a low-frequency signal;

a switch control circuit, coupled to the antenna detection circuit, configured to receive an antenna detection signal generated by the open-circuit path or the short-circuit path to generate a first control signal indicative of the presence of the second antenna upon the detection thereof, and a controller, coupled to the first antenna, the antenna detection circuit and the switch control circuit, configured to receive the first control signal and connect to the second antenna when the first control signal indicates the presence of the second antenna.

2. The antenna device of claim 1, wherein the switch control circuit comprises first and second transistors coupled to the inductor, and upon detecting the presence of the second antenna, the first transistor is configured to generate a second control signal to disconnect the first antenna from the controller, and the second transistor is configured to generate the first control signal to connect the second antenna to the controller.

3. The antenna device of claim 1, further comprises an isolation circuit coupled between the antenna detection circuit from the switch control circuit, configured to separate the antenna detection circuit from the switch control circuit and pass the detection of the second antenna to the switch control circuit.

4. The antenna device of claim 1, wherein the inductor is configured to indicate the presence of the second antenna device.

5. An antenna switch circuit, comprising:

an antenna detection circuit, comprising only an inductor configured to detect presence of a first antenna and directly connected between the second antenna and a ground terminal, wherein when the second antenna is absent, the inductor serves as an open-circuit path for a high-frequency signal, when the second antenna is present, the inductor serves as a short-circuited path for a low-frequency signal; and a switch control circuit, coupled to the antenna detection circuit, configured to receive an antenna detection signal generated by the open-circuit path or the short-circuit path to generate a first control signal indicative of the presence of the first antenna upon the detection thereof, and controls a controller to connect to the first antenna according to the first control signal.

6. The antenna switch circuit of claim 5, wherein the switch control circuit comprises first and second transistors coupled to the inductor, and upon detecting the presence of the first antenna, the first transistor is configured to generate the first control signal, and second transistor is configured to generate a second control signal to disconnect a second antenna from the controller.

7. The antenna switch circuit of claim 5, further comprises an isolation circuit coupled between the antenna detection circuit from the switch control circuit, configured to separate the antenna detection circuit from the switch control circuit and pass the detection of the first antenna to the switch control circuit.

8. The antenna switch circuit of claim 5, wherein the inductor is configured to indicate the presence of the first antenna device.

* * * * *